United States Patent
Newcomb et al.

(10) Patent No.: US 12,326,254 B1
(45) Date of Patent: Jun. 10, 2025

(54) STRUCTURAL COMPOSITE WITH ENCAPSULATED MICROLED TASK LIGHTING AND MOLDED-IN OPTICS

(71) Applicant: GM GLOBAL TECHNOLOGY OPERATIONS LLC, Detroit, MI (US)

(72) Inventors: Bradley Allen Newcomb, Troy, MI (US); Jonglee Park, Novi, MI (US); Julien P. Mourou, Bloomfield Hills, MI (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 0 days.

(21) Appl. No.: 18/441,048

(22) Filed: Feb. 14, 2024

(51) Int. Cl.
| | |
|---|---|
| H01L 33/56 | (2010.01) |
| B29D 11/00 | (2006.01) |
| B32B 3/04 | (2006.01) |
| B32B 5/06 | (2006.01) |
| B32B 27/12 | (2006.01) |

(Continued)

(52) U.S. Cl.
CPC ........ F21V 5/007 (2013.01); B29D 11/00807 (2013.01); B32B 3/04 (2013.01); B32B 5/073 (2021.05); B32B 27/12 (2013.01); F21V 19/0025 (2013.01); F21V 23/002 (2013.01); F21V 29/503 (2015.01); F21V 29/70 (2015.01); B32B 2260/021 (2013.01); B32B 2260/046 (2013.01); B32B 2307/202 (2013.01); B32B 2307/302 (2013.01); B32B 2307/41 (2013.01); B32B 2307/412 (2013.01); B32B 2457/00 (2013.01); F21Y 2113/00 (2013.01); F21Y 2115/10 (2016.08)

(58) Field of Classification Search
CPC .... F21V 5/007; F21V 19/0025; F21V 23/002; F21V 29/503; F21V 29/70; B29D 11/00807; B32B 3/04; B32B 5/073; B32B 27/12; B32B 2260/021; B32B 2260/046; B32B 2307/202; B32B 2307/302; B32B 2307/41; B32B 2307/412; B32B 2457/00; F21Y 2113/00
See application file for complete search history.

(56) References Cited

U.S. PATENT DOCUMENTS

| | | | |
|---|---|---|---|
| 2018/0039036 A1* | 2/2018 | Fink | F21S 4/15 |
| 2023/0084891 A1* | 3/2023 | Vasylyev | F21V 9/02 |
| | | | 362/249.02 |

FOREIGN PATENT DOCUMENTS

| | | |
|---|---|---|
| DE | 102012109144 A1 | 4/2014 |
| DE | 112020003257 T5 | 3/2022 |
| DE | 102022126685 A1 | 9/2023 |

OTHER PUBLICATIONS

U.S. Appl. No. 18/462,769, filed Sep. 7, 2023, Park et al.
(Continued)

Primary Examiner — Elmito Breval

(57) ABSTRACT

A composite structure includes a structural composite including a plurality of reinforcing fibers encapsulated in a first polymer resin. M sets of traces are arranged on the structural composite. N sets of microLEDs are arranged on the structural composite and connected to the M sets of traces, respectively, where M and N are integers greater than zero. One or more cables are connected to the M sets of traces. The structural composite, the M sets of traces, the N sets of microLEDs, a portion of the one or more cables are encapsulated in a second polymer resin. The second polymer resin includes an integrated lens adjacent to the N sets of microLEDs.

18 Claims, 6 Drawing Sheets

(51) Int. Cl.
  *F21V 5/00*      (2018.01)
  *F21V 19/00*     (2006.01)
  *F21V 23/00*     (2015.01)
  *F21V 29/503*    (2015.01)
  *F21V 29/70*     (2015.01)
  *F21Y 113/00*    (2016.01)
  *F21Y 115/10*    (2016.01)

(56) References Cited

OTHER PUBLICATIONS

U.S. Appl. No. 18/488,892, filed Oct. 17, 2023, Guo et al.
German Office Action from counterpart DE1020241093757, dated Oct. 18, 2024.

* cited by examiner

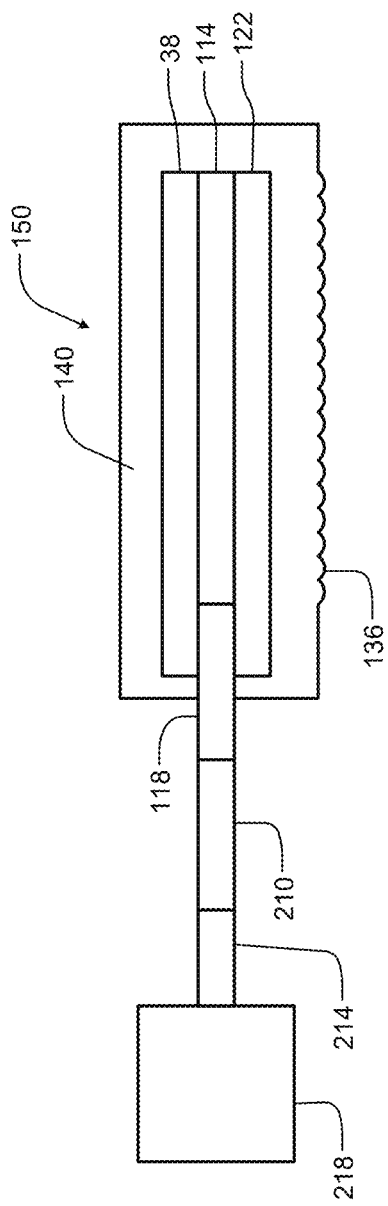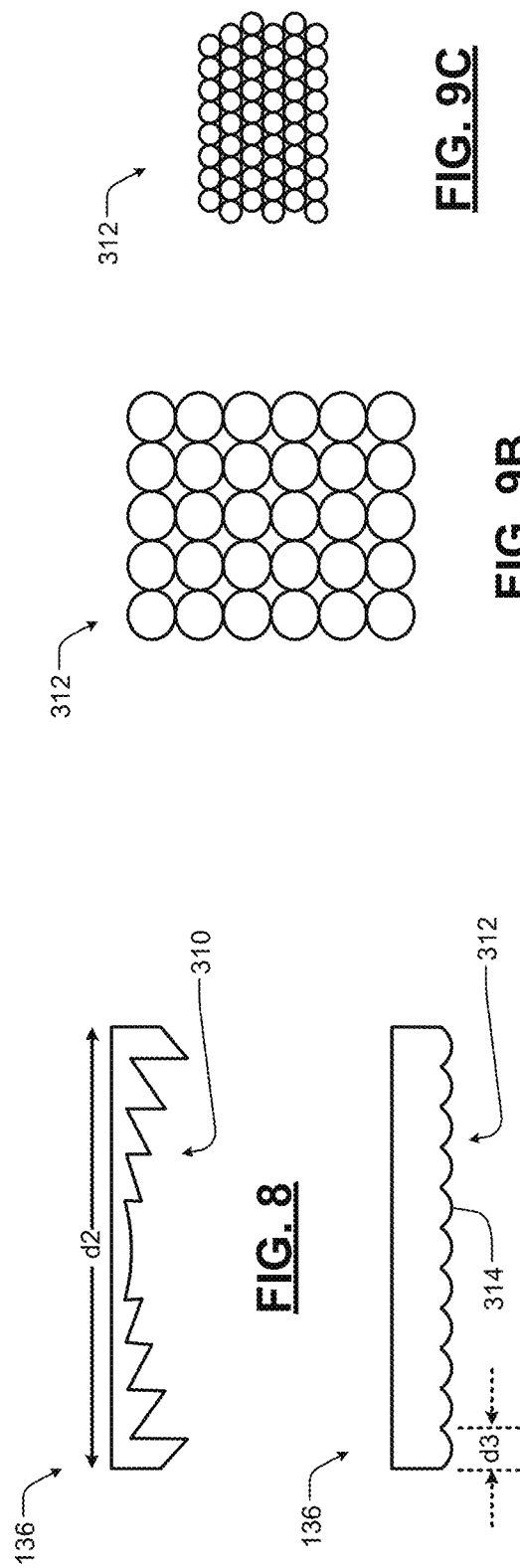

STRUCTURAL COMPOSITE WITH ENCAPSULATED MICROLED TASK LIGHTING AND MOLDED-IN OPTICS

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to structural composites, and more particularly to a structural composite with hidden and encapsulated microLED task lighting with molded-in optics.

Structural components include reinforcing fibers encapsulated in a resin. Structural components have been used to replace other structural components such as a roof of a vehicle to reduce weight. Since the reinforcing fibers do not need to be located throughout the structural component, the resin can be transparent to allow light to pass through the structural component.

SUMMARY

A composite structure includes a structural composite including a plurality of reinforcing fibers encapsulated in a first polymer resin. M sets of traces are arranged on the structural composite. N sets of microLEDs are arranged on the structural composite and connected to the M sets of traces, respectively, where M and N are integers greater than zero. One or more cables are connected to the M sets of traces. The structural composite, the M sets of traces, the N sets of microLEDs, a portion of the one or more cables are encapsulated in a second polymer resin. The second polymer resin includes an integrated lens adjacent to the N sets of microLEDs.

In other features, N thermally conductive stacks are in thermal contact with the N sets of microLEDs and encapsulated in the second polymer resin. The integrated lens is selected from a group consisting of a Fresnel lens, a flute lens, a concave lens, a convex lens, a pillow optic lens, and a micro lens. The N sets of microLEDs are arranged in an array including rows and columns.

In other features, the structural composite includes a polymer substrate, and the reinforcing fibers are attached by thread to the polymer substrate.

In other features, the structural composite includes transparent regions and opaque regions, and the M sets of traces and the N sets of microLEDs are at least partially arranged adjacent to the opaque regions. The structural composite includes transparent regions and opaque regions, and the M sets of traces and the N sets of microLEDs are arranged adjacent to the opaque regions. The N sets of thermally conductive stacks include a thermally conductive layer.

In other features, the N sets of thermally conductive stacks include a first interphase layer, a first polymer layer, and a second interphase layer. The second polymer resin is transparent. The reinforcing fiber acts as a heat sink for the N microLEDs.

A method for manufacturing a composite structure includes providing a structural composite including a plurality of reinforcing fibers encapsulated in a first polymer resin; arranging M sets of traces on the structural composite, where M and N are integers greater than one; arranging N sets of microLEDs on the structural composite and connected to the M sets of traces, respectively; connecting one or more cables to the M sets of traces; encapsulating the structural composite, the M sets of traces, the N sets of microLEDs, and a portion of the one or more cables in a second polymer resin; and forming an integrated lens adjacent to the N sets of microLEDs using the second polymer resin.

In other features, the method includes arranging N thermally conductive stacks in thermal contact with the N sets of microLEDs. The integrated lens is selected from a group consisting of a Fresnel lens, a flute lens, a concave lens, a convex lens, a pillow optic lens, and a micro lens. The N sets of microLEDs are arranged in an array including rows and columns. The method includes attaching the plurality of reinforcing fibers to a polymer substrate using thread; and encapsulating the polymer substrate, the plurality of reinforcing fibers and the thread.

In other features, the structural composite includes transparent regions and opaque regions, and the M sets of traces and the N sets of microLEDs are at least partially arranged adjacent to the opaque regions. The N sets of thermally conductive stacks include a thermally conductive layer, a first interphase layer, a first polymer layer, and a second interphase layer. The second polymer resin is transparent. The reinforcing fiber acts as a heat sink for the N microLEDs.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 7 is a side cross section of an example of a controller connected to the microLED arrays of the structural composite according to the present disclosure;

FIGS. 8 and 9A are side cross sections of examples of lenses according to the present disclosure;

FIGS. 9B and 9C are bottom views of examples of the lens in FIG. 9A.

In the drawings, reference numbers may be reused to identify similar and/or identical elements.

DETAILED DESCRIPTION

Figure 2:
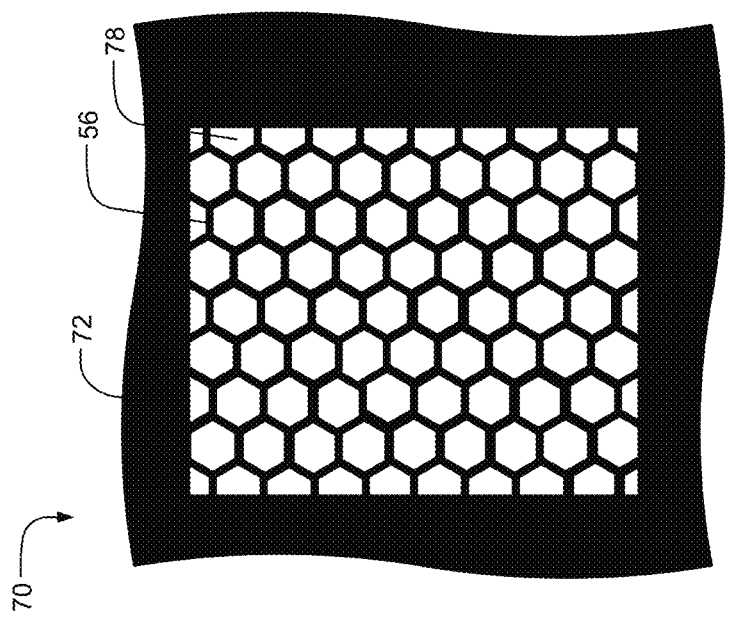
FIG. 2 is a plan view of an example of a structural component including reinforcing fibers, transparent areas, and opaque areas according to the present disclosure.

While structural composites are described below in the context of a roof of a vehicle, the structural composites can be used in other vehicle or non-vehicle applications.

Conventional task lighting systems for interior applications in a vehicle typically include a light source, a housing, and a lens. The housing and the lens are used to control light output by the light source. When a portion of a roof or another interior structure is replaced by a partially transparent structural composite, there is a styling mismatch relative to the transparent portions of the structural composite and components of the task lighting system. In other words, the components of the task lighting system are visible and may not be visually attractive.

The present disclosure relates to a partially transparent structural composite such as a roof panel including encapsulated microLED arrays and molded-in lenses to improve the task lighting system. The structural composite includes transparent portions and opaque portions. Some of the opaque portions include reinforcing fibers. In some examples, the microLEDs and wiring are partially or fully hidden by the reinforcing fibers in the opaque portions of the structural composite so that they are hidden and/or do not obscure the transparent portions. In other examples, the microLEDs and traces can be located in transparent portions and are at least partially visible.

The structural composite is manufactured using one or more injection molding or compression molding steps. In some examples, the structural composite includes a polymer substrate. Reinforcing fibers are arranged in a predetermined pattern on the polymer substrate. In some examples, tailored fiber placement (TFP) is used to place and stitch the reinforcing fibers onto the polymer substrate in a predetermined pattern. Then, the reinforcing fibers are consolidated with the polymer layer in polymer resin to form a structural composite.

After consolidation of the structural composite, traces are formed on the first structural composite and an array of microLEDs is attached to the traces. In some examples, the microLED array and/or the traces are attached to opaque portions of the first structural composite (such as those adjacent to the reinforcing fibers). A cable is attached to the traces to provide an external connection to the microLED array. In some examples, the cable is arranged at least partially along the opaque portions of the first structural composite. In some examples, a consolidation step is optionally performed before adding a thermally conductive stack adjacent to the microLED array. In other examples, the thermally conductive stack is consolidated with the structural composite, the traces, and the array of microLEDs.

The first structural composite, the microLEDs, and the thermally conductive stack are arranged in an injection molding or compression tool. The injection molding or compression tool includes a mold portion defining one or more integrated optical surfaces (e.g., one or more lenses) in one or more predetermined locations. In some examples, the first structural composite, the microLEDs, and the thermally conductive stack are consolidated using a transparent resin to form a second composite structure including one or more molded-in lenses. Normally, microLEDs produce a Lambertian lighting pattern that may not be suitable for task lighting applications. The one or more lenses create desired lighting patterns using light output by the microLED array.

It is also possible for the micro LED light source to be hidden by the opaque structural material during unlit status to provide a hidden-until-lit feature. In some examples, the thermally conductive stack includes multiple thermal conductive layers to protect the micro LED light source from high temperature during molding process.

Figure 1:
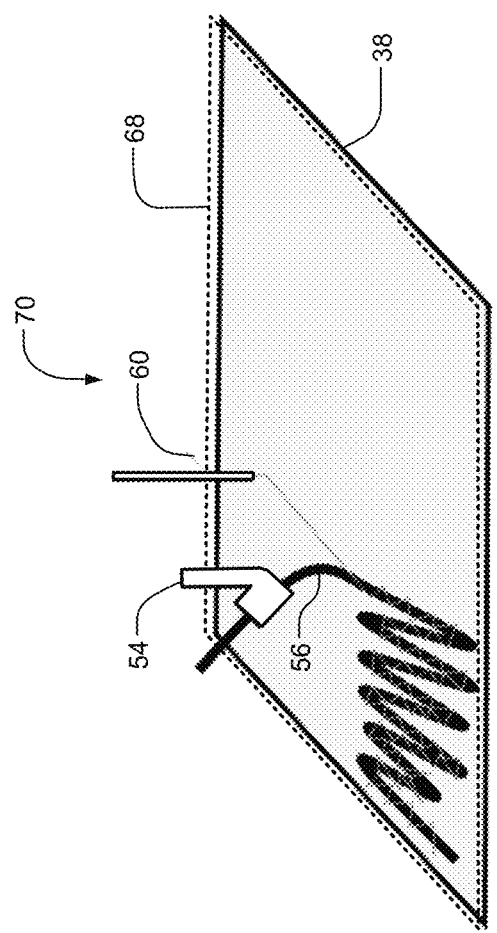
FIG. 1 is a perspective view illustrating of an example of reinforcing fibers arranged in predetermined locations on the consolidated substrate and attached by thread according to the present disclosure.

Referring now to FIGS. 1 and 2, stitching of a reinforcing fiber 56 onto a polymer substrate 38 in a predetermined pattern is shown. The reinforcing fibers 56 are attached by thread 60 onto the polymer substrate 38. The reinforcing fibers 56 pass through a guide 54 that is moved relative to the polymer substrate 38 to define a pattern. In some examples, tailored fiber placement (TFP) is used and the guide 54 is directed by a robot. In some examples, the reinforcing fibers 56 are attached in future locations of traces and/or microLED arrays and/or in other locations. After the reinforcing fibers 56 are attached, the reinforcing fibers 56 and the polymer substrate 38 may be consolidated in polymer resin to create a composite structure 70. In some examples, the reinforcing fibers 56 are made of a conducting material such as carbon and the reinforcing fibers act as a heat sink.

In FIG. 2, an example of the composite structure 70 is shown to include a pattern of the reinforcing fibers 56, opaque portions 72 (including the reinforcing fibers 56), and transparent portions 78. As will be described further below, the microLED arrays and the traces are fully or at least partially located adjacent to the opaque portions and/or below the reinforcing fibers 56 such that the microLEDs and traces are hidden from view until illuminated.

Figure 3A:
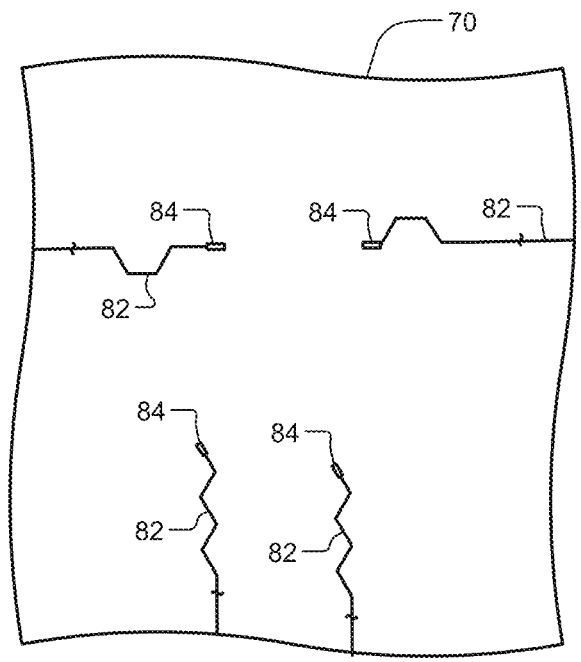
FIG. 3A is a plan view of an example of a structural component including traces and microLED arrays according to the present disclosure.
Figure 3B:
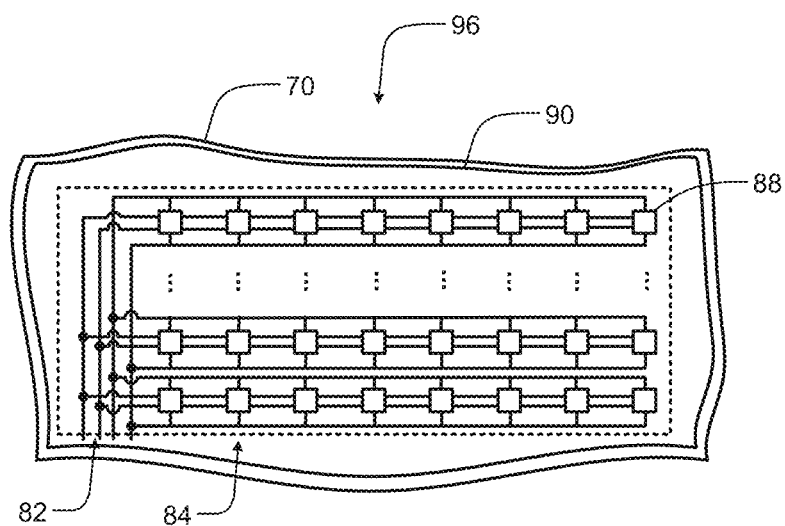
FIGS. 3B to 3D are enlarged plan views of examples of arrays of microLEDs and traces according to the present disclosure.

Referring now to FIGS. 3A and 3B, the composite structure 70 is shown as transparent for illustration purposes. However, the composite structure 70 will typically include both transparent and opaque portions as shown in FIG. 2. Sets of traces 82 are formed on the composite structure 70 in a predetermined pattern. In some examples, the predetermined pattern of the traces 82 fully or partially overlaps the predetermined pattern of the reinforcing fibers. MicroLED arrays 84 are arranged on the composite structure 70 and connected on and/or to the traces 82. For example, the sets of traces 82 extend from edges of the composite structure 70 to a corresponding one of the microLED arrays 84. In the example in FIG. 3A, four of the microLED arrays 84 are connected by four sets of the traces 82. As can be appreciated, the microLED arrays 84 can be located in other positions and fewer or additional microLED arrays can be used.

In some examples, the traces 82 are applied on the composite structure 70 in one or more predetermined patterns using conductive ink. The microLED arrays 84 are attached onto the traces 82. Additional details and other examples are shown and described in commonly-assigned U.S. patent application Ser. No. 17/699,696, filed on Mar. 21, 2022, which is hereby incorporated herein by reference in its entirety.

In FIG. 3B, an example of one of the microLED arrays 84 is shown to include a plurality of microLEDs 88 arranged in rows and columns and connected to the traces 82. In some examples, the traces 82 include power, ground, a row control signal, and a column control signal, although other control arrangements can be used. In some examples, the traces and/or the plurality of microLEDs 88 are at least partially placed in locations corresponding to opaque portions (e.g., locations with reinforcing fibers 56).

Figure 3D:
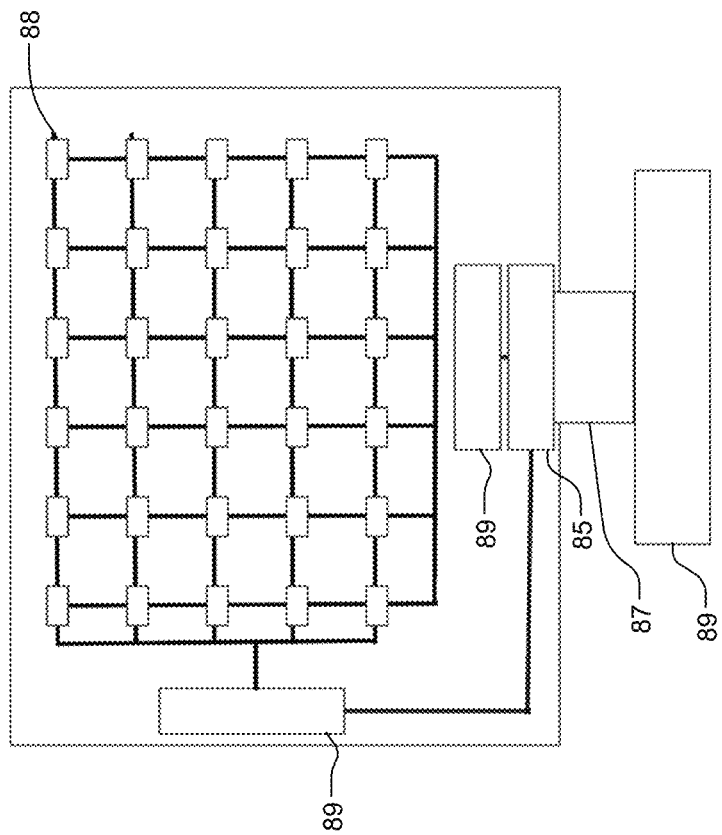
Figure 3C:
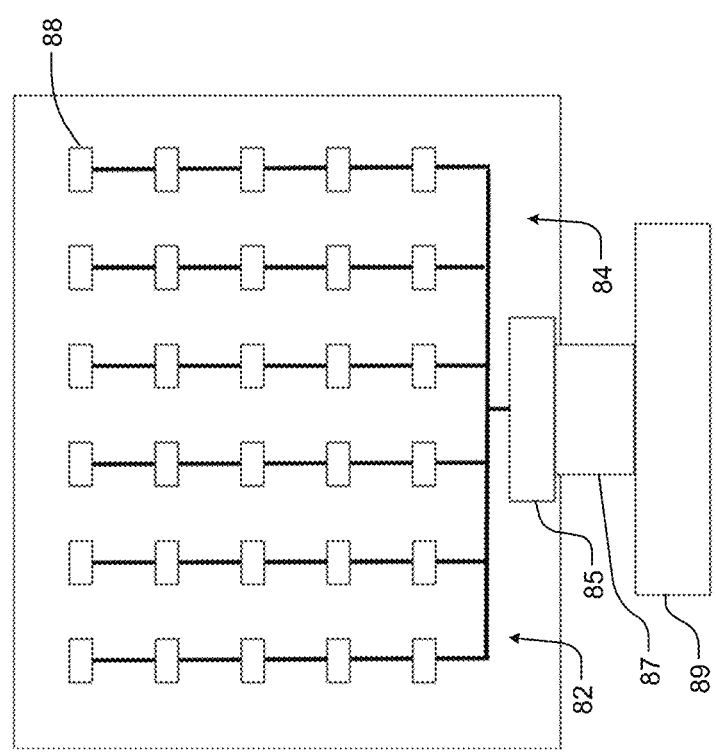

Referring now to FIGS. 3C and 3D, other example configurations are shown. In FIG. 3C, the microLED array 84 is connected by the traces 82 to a connector 85. The connector 85 is connected by a cable 87 to a driver 89. In FIG. 3D, the microLED array 84 is connected by traces to drivers 87. The drivers 87 are encapsulated and are connected by a connector 85 to a cable 87 and a controller 89.

Figure 4:
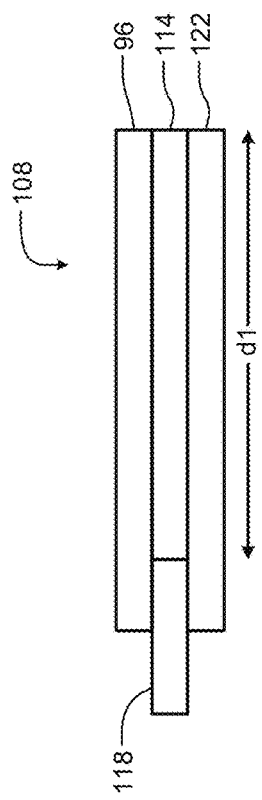
FIG. 4 is a side cross section illustrating an example of a stack including a structural composite, a microLED panel, and a thermally conductive stack according to the present disclosure.

In FIG. 4, one or more cables 118 are used to provide external connections to the microLED arrays 84, respectively. For example, the cable 118 is connected by the traces 82 to the microLED array 84 to provide power, ground, and/or control signals. After the traces 82 are formed/deposited and the microLED arrays 84 are placed, the composite structure 70, the traces 82, the cables 118, and the microLED array 84 can optionally be consolidated by a polymer resin 90 to form a composite structure 96.

A thermally conductive stack 122 is arranged adjacent to the microLED array 114 (either before or after consolidation) to provide thermal management. In some examples, the thickness of the thermally conductive stack 122 is in a range from 0.5 mm to 5.0 mm, although other thicknesses can be used.

Figure 5:
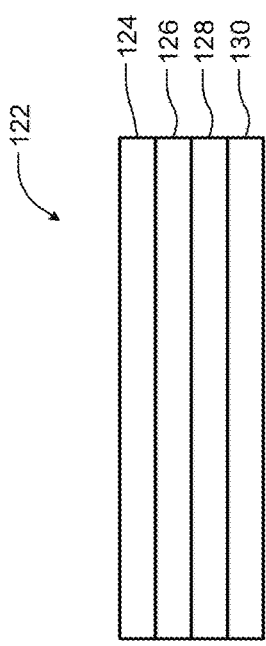
FIG. 5 is a side cross section illustrating an example of the thermally conductive stack according to the present disclosure.

Referring now to FIG. 5, an example of the thermally conductive stack 122 is shown to include a thermal conductive layer 124, a first interphase polymer layer 126, a polymer layer 128, and a second interphase polymer layer 130. In some examples, the thermal conductive layer 124 includes a graphene layer (k~3000 W/m-K), a single layer hexagonal boron nitride (h-BN) (k~550 W/m-K), Al2O3 (k~10 W/m-K), sapphire (k~1000 W/m-K), and/or indium tin oxide (k~2 W/m-K), although other materials can be used.

In some embodiments, the first interphase polymer layer 126 includes a first polymer A and a second polymer B. In some embodiments, the first polymer A is made of a same material that encapsulates the microLED array. In some embodiments, the second polymer B is made of a same polymer material as the polymer layer 128. In some examples, the polymer layer 128 includes a transparent polymer suitable for over-molding.

In some embodiments, the polymer layer 128 is made of a different transparent polymer than the material encapsulating the microLED array. In some embodiments, the second interphase polymer layer 130 includes the second polymer B and a transition material of a same type as the over-molding polymer C. Additional details relating to the thermally conductive stack 122 can be found in commonly-assigned U.S. patent application Ser. No. 18/462,769, filed on Sep. 7, 2023, which is hereby incorporated herein by reference in its entirety.

Figure 6:
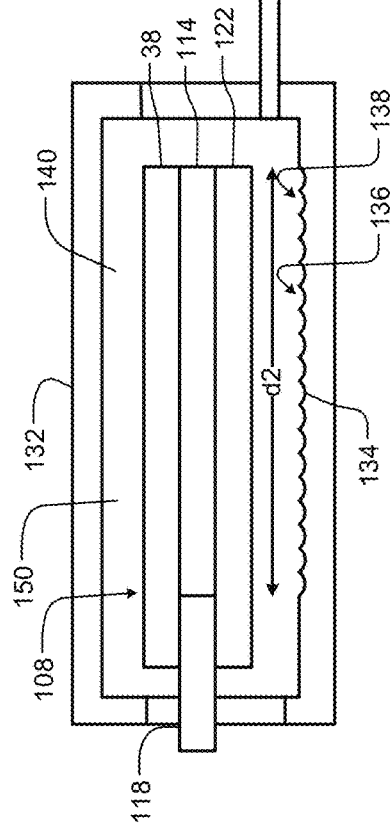
FIG. 6 is a side cross section of an example of the stack consolidated in resin in a molding tool including a lens molding portion according to the present disclosure.

Referring now to FIGS. 6 and 7, the stack 108 is arranged in a cavity of an injection molding tool 132. The stack 108 is consolidated in a polymer resin 140 using injection or compression molding to form a composite structure 150. An inner surface 134 of the injection molding tool 132 includes a patterned area 136 such as a cavity with a predetermined surface profile that is designed to form a lens 138 on the composite structure 150. The lens 138 is located to receive and modulate light from one of the microLED arrays. In some examples, a width of the microLED array 114 is equal to d1 and a width of the lens 138 is equal to d2, where d2>d1. The injection molding tool 132 injects a polymer resin 140 into the cavity to encapsulate the stack 108. In some examples, a portion of the cable 118 extends from the polymer resin 140 to allow external connections to be made.

In FIG. 7, the composite structure 150 is removed from the injection molding tool 132. The cable 118 is connected by a connector 210 and a cable 214 to an LED controller 218 or directly to the LED controller 218.

Referring now to FIGS. 8 to 12, non-limiting examples of the lens 138 are shown. In FIG. 8, the lens 138 includes a patterned surface 310 defining a Fresnel lens. In FIG. 9A, the lens 138 includes a patterned surface 312 defining an array of lenses 314. In FIG. 9B, the patterned surface 312 defines a pillow optic lens with an array of lenses 314 having a dimension d3 in a range from 1 mm to 3 mm. In FIG. 9C, the patterned surface 312 defines a micro lens array with lenses 314 having a dimension d3 in a range from 0.1 mm to less than 1 mm.

Figure 11:
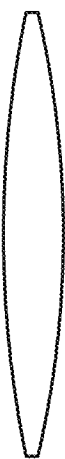
FIGS. 10 to 12 are side cross sections of examples of lenses according to the present disclosure.
Figure 12:
Figure 10:
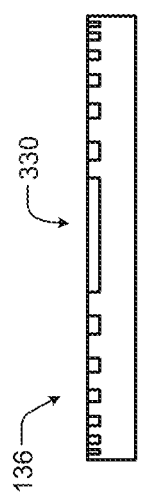

In FIG. 10, the lens 138 includes a pattern of cavities 330 defining a fluted lens. In FIG. 11, the lens 138 includes a convex lens. In FIG. 12, the lens 138 includes a concave lens. While specific examples of lenses are shown, other lenses can be used.

In some examples, a transparent and/or an opaque polymer resin is used. Examples of transparent polymer resin include epoxy, polyurethane (PUR), polycarbonate (PC), polymethyl methacrylate (PMMA), polyethylene terephthalate (PET), polyacrylate (acrylic), polyamide (PA), co-transparent layers thereof, and combinations thereof.

In some examples, the reinforcing fibers are selected from a group consisting of glass fibers, carbon fibers, basalt fibers, aramid fibers, polyethylene fibers, polypropylene fibers, natural fibers, or any combination thereof. In some examples, dry fibers are used. In other examples, reinforcing fibers are impregnated with resin or polymer fibers. For example, carbon fibers (e.g., carbon black, carbon nanotubes, talc, fibers derived from polyacrylonitrile and/or pitch precursors), glass fibers (e.g., fiber glass, quartz), basalt fibers, aramid fibers (e.g., KEVLAR®, polyphenylene benzobisoxazole (PBO)), polyethylene fibers (e.g., high-strength ultra-high molecular weight (UHMW) polyethylene), polypropylene fibers (e.g., high-strength polypropylene), natural fibers (e.g., cotton, flax, cellulose, spider silk), and combinations thereof can be used.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

What is claimed is:

1. A composite structure comprising:
   a structural composite including a plurality of reinforcing fibers encapsulated in a first polymer resin, the structural composite including a polymer substrate, and the plurality of reinforcing fibers attached by thread to the polymer substrate;
   M sets of traces arranged on the structural composite;
   N sets of microLEDs arranged on the structural composite and connected to the M sets of traces, respectively, where M and N are integers greater than zero; and
   one or more cables connected to the M sets of traces,
   wherein the structural composite, the M sets of traces, the N sets of microLEDs, a portion of the one or more cables are encapsulated in a second polymer resin, and
   wherein the second polymer resin includes an integrated lens adjacent to the N sets of microLEDs.

2. The composite structure of claim 1, further comprising N thermally conductive stacks in thermal contact with the N sets of microLEDs and encapsulated in the second polymer resin.

3. The composite structure of claim 1, wherein the integrated lens is selected from a group consisting of a Fresnel lens, a flute lens, a concave lens, a convex lens, a pillow optic lens, and a micro lens.

4. The composite structure of claim 1, wherein the N sets of microLEDs are arranged in an array including rows and columns.

5. The composite structure of claim 1, wherein:
   the structural composite includes transparent regions and opaque regions, and
   the M sets of traces and the N sets of microLEDs are at least partially arranged adjacent to the opaque regions.

6. The composite structure of claim 1, wherein:
   the structural composite includes transparent regions and opaque regions, and
   the M sets of traces and the N sets of microLEDs are arranged adjacent to the opaque regions.

7. The composite structure of claim 1, wherein the N sets of thermally conductive stacks include a thermally conductive layer.

8. The composite structure of claim 1, wherein N sets of thermally conductive stacks include:
   a first interphase layer;
   a first polymer layer; and
   a second interphase layer.

9. The composite structure of claim 1, wherein the second polymer resin is transparent.

10. The composite structure of claim 1, wherein the plurality of reinforcing fibers acts as a heat sink for the N sets of microLEDs.

11. A method for manufacturing a composite structure comprising:
    providing a structural composite including a plurality of reinforcing fibers encapsulated in a first polymer resin;
    attaching the plurality of reinforcing fibers to a polymer substrate using thread;
    encapsulating the polymer substrate, the plurality of reinforcing fibers and the thread;
    arranging M sets of traces on the structural composite, where M and N are integers greater than one;
    arranging N sets of microLEDs on the structural composite and connected to the M sets of traces, respectively;
    connecting one or more cables to the M sets of traces;
    encapsulating the structural composite, the M sets of traces, the N sets of microLEDs, and a portion of the one or more cables in a second polymer resin; and
    forming an integrated lens adjacent to the N sets of microLEDs using the second polymer resin.

12. The method of claim 11, further comprising arranging N thermally conductive stacks in thermal contact with the N sets of microLEDs.

13. The method of claim 11, wherein the integrated lens is selected from a group consisting of a Fresnel lens, a flute lens, a concave lens, a convex lens, a pillow optic lens, and a micro lens.

14. The method of claim 11, wherein the N sets of microLEDs are arranged in an array including rows and columns.

15. The method of claim 11, wherein:
    the structural composite includes transparent regions and opaque regions, and
    the M sets of traces and the N sets of microLEDs are at least partially arranged adjacent to the opaque regions.

16. The method of claim 11, wherein the N sets of thermally conductive stacks include a thermally conductive layer, a first interphase layer, a first polymer layer, and a second interphase layer.

17. The method of claim 11, wherein the second polymer resin is transparent.

18. The method of claim 11, wherein the plurality of reinforcing fibers acts as a heat sink for the N sets of microLEDs.

* * * * *